June 21, 1960 L. F. PRINCE 2,941,566
TRACTION DEVICE FOR VEHICLE
Filed Jan. 31, 1957 3 Sheets-Sheet 1

Luther F. Prince
INVENTOR.

BY *Attorneys*

June 21, 1960 L. F. PRINCE 2,941,566
TRACTION DEVICE FOR VEHICLE
Filed Jan. 31, 1957 3 Sheets-Sheet 2

Luther F. Prince
INVENTOR.

BY
Attorneys

June 21, 1960

L. F. PRINCE 2,941,566

TRACTION DEVICE FOR VEHICLE

Filed Jan. 31, 1957

Luther F. Prince
INVENTOR.

BY *Thomas A. O'Brien*
*and Harvey B. Jacobson*
Attorneys

United States Patent Office 2,941,566
Patented June 21, 1960

2,941,566
TRACTION DEVICE FOR VEHICLE
Luther F. Prince, 315 E. 56th St., Chicago, Ill.
Filed Jan. 31, 1957, Ser. No. 637,515
2 Claims. (Cl. 152—208)

This invention relates in general to new and useful improvements in vehicles, and more specifically to an improved traction device for vehicles.

The average car construction is such that a vehicle retains sufficient traction when driving over normal road surfaces even when wet. However, when the road surfaces become covered with snow and ice, particularly ice, the tire tread is such that insufficient traction is obtained in many instances and as a result either the vehicle becomes stalled or the operator may lose control of the vehicle and end up in a collision with another vehicle.

In order to increase the traction of vehicles, there has been devised many types of traction devices. These traction devices include attachments for vehicle wheels which are adapted to project beyond the wheels for engagement with the roadway surface. However, the average vehicle has insufficient space within which to mount such traction devices.

It is therefore the primary object of this invention to provide an improved traction device for vehicles, the traction device being mounted within the tires of the vehicle for projection from the tread thereof whereby the traction device occupies very little space not occupied by the vehicle wheel and thus is readily adaptable for installation on modern day automobiles.

Another object of this invention is to provide an improved tire construction, the tire being provided with a plurality of bores opening outwardly through the road engaging surface thereof, there being mounted within each bore a fluid cylinder having a piston disposed therein for reciprocation and there being secured to each of the pistons roadway engaging elements which are normally recessed within their respective bores and which are extensible therefrom beyond the road engaging surface of the tire to increase the traction of the tire.

Another object of this invention is to provide an improved traction device for vehicles, the traction device including extensible road engaging elements carried by the individual tires of a vehicle for projection beyond the tread thereof, and there being a fluid system provided for the control of the projection of the elements, the fluid system being frictionally carried by the vehicle and including a distributor for each of the vehicle wheels, the distributor being mounted on the wheel for rotation therewith and having connected thereto a fixed fluid supply pipe.

Still another object of this invention is to provide a novel pump structure for controlling the operation of a traction device for a vehicle, the pump structure including a pump cylinder having mounted therein for reciprocation a piston, the piston being carried by a piston rod which includes a rack portion and there being provided a motor driven gear engagement of the rack whereby a motor for the gear may be connected into the electrical system of the vehicle for reciprocating the piston rod and pump piston as is necessary to effect the pumping of a fluid.

A further object of this invention is to provide an improved traction device for vehicles, the traction device including a plurality of tubeless tires, there being mounted within the tubeless tires fluid motors having connected thereto traction elements for projections from the tread of the cars, there being mounted within the tire suitable fluid lines connected to the fluid motors for selectively supplying fluid under pressure to the fluid motors to effect actuation of the fluid motors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
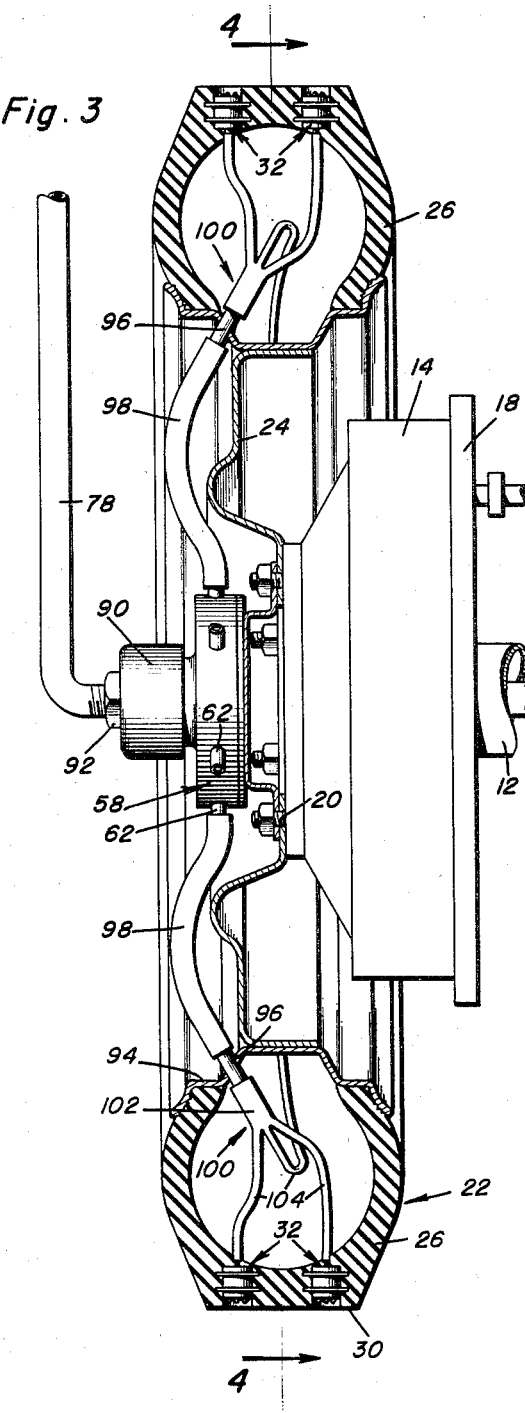
Figure 3 is an enlarged transverse sectional view taken through one of the wheels of the wheel assembly of Figure 1 and shows the specific details of construction of one of the tires and the details of that portion of the traction device carried by the tire and connected thereto.
Figure 4:
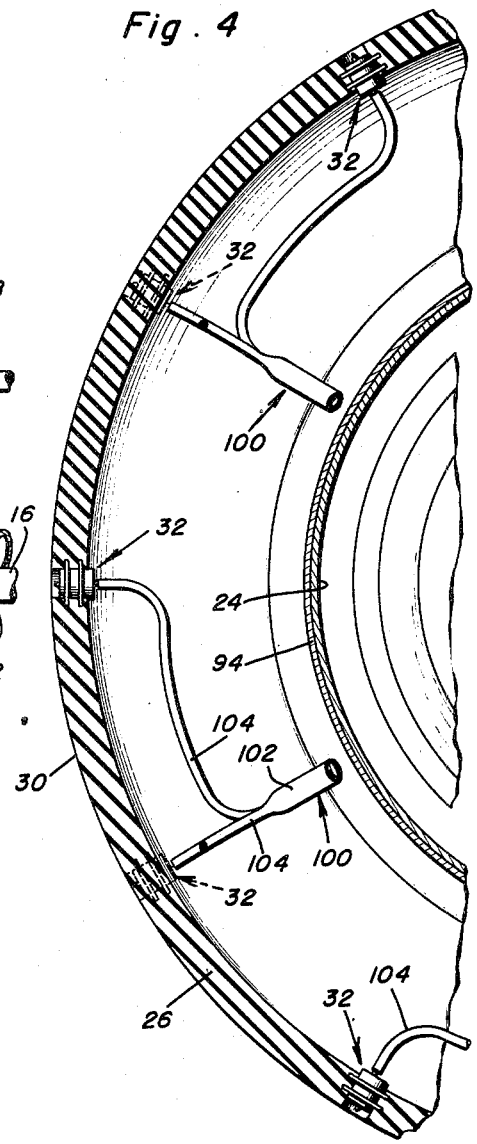
Figure 4 is an enlarged fragmentary sectional view taken substantially upon the plane indicated by the section line 4—4 of Figure 3 and shows further the details of construction of the tire.
Figure 7:
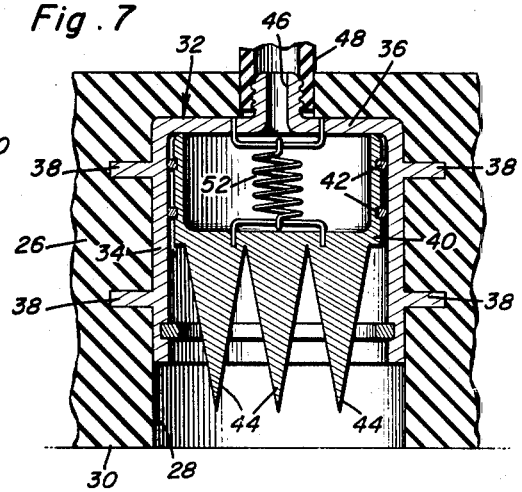
Figure 8:
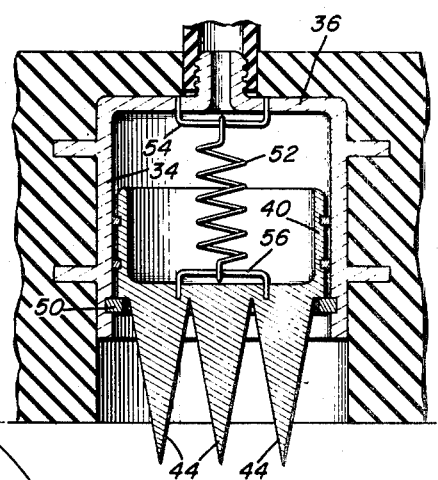
Figure 5:
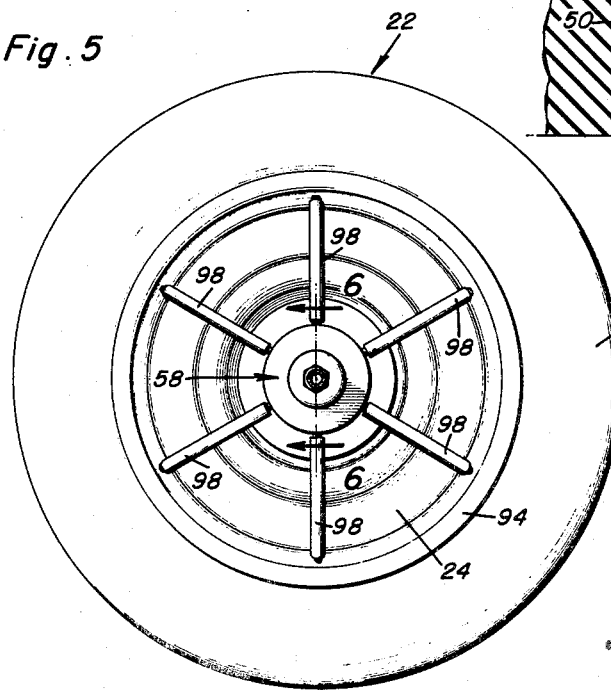
Figure 5 is a side elevational view of one of the tires and shows the arrangement of the fluid supply lines connected to a distributor carried by the wheel on which the tire is mounted.

Figure 7 is an enlarged fragmentary sectional view taken through the tread portion of the tire of Figure 3 and shows the specific details of a fluid motor carried thereby and a roadway engaging element carried by the fluid motor for projection beyond the thread of the tire to increase the traction of the tire, the roadway engaging element being shown in a retracted position; and Figure 8 is an enlarged fragmentary sectional view similar to Figure 7 and shows the roadway engaging element in a projected position extending beyond the tread of the tire for engagement with a roadway or a surface coating on such roadway.

Figure 1:
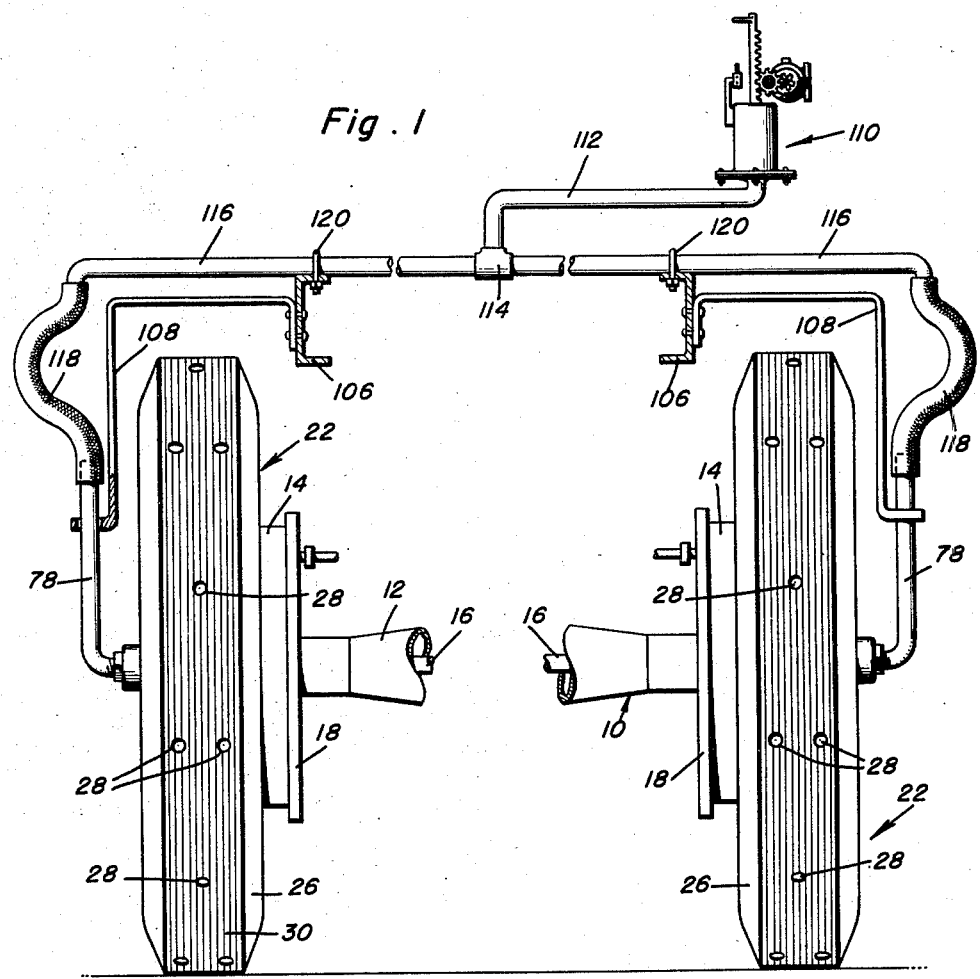
Figure 1 is a schematic transverse sectional view taken through a vehicle showing a portion thereof including a part of the frame and rear wheel assembly, there being mounted on the vehicle the traction device which is the subject of this invention.

Referring now to the drawings in detail, it will be seen that there is illustrated in Figure 1 a rear wheel assembly of a vehicle, the rear wheel assembly being referred to in general by the reference numeral 10. The rear wheel assembly 10 includes a rear axle housing 12 which carries at opposite ends thereof for rotation brake drums 14. Connected to the brake drums 14 for driving the same are rear axles 16. The brake drums 14 also have associated therewith fixed backing plates 18 which are rigidly secured to the rear axle housing 12 and which carry brake shoes (not shown) for engagement with the interior surface of the brake drum 14 to control the braking action of the vehicle.

As is best illustrated in Figure 3, the brake drum 14 is provided with a plurality of lug bolts 20 which are used to secure to the brake drum 14 a wheel assembly which is referred to in general by the reference numeral 22. The wheel assembly 22 in this instance includes a wheel 24 having mounted thereon a tire 26 which is of the tubeless type. With the exception of the traction device which will be described in more detail hereinafter, the above mechanism is conventional in all vehicles.

Referring now to Figures 7 and 8 in particular, it will be seen that the tire 26 is provided with a bore 28 which opens out through the tread surface 30 thereof. Positioned in the bore 28 is a fluid motor which is referred to in general by the reference numeral 32. The fluid motor 32 includes a fluid cylinder 34 having an inner end closed by an inner end wall 36. Projecting from the fluid cylinder 34 is a plurality of anchoring rings 38 which are suitably anchored within the interior of the tire 26.

The fluid motor 32 also includes a piston 40 having suitable sealing rings 42 for sealing engagement with the internal wall of the fluid cylinder 34. Carried by the piston 40 for engagement with a roadway surface are roadway engaging elements 44. The roadway engaging elements 44 are in the form of a plurality of spikes which extend transversely of the tire 26.

In order that the roadway engaging elements 44 may be extended out through the bore 28 beyond the tread surface 30 to the position illustrated in Figure 8, there is connected to the fluid cylinder 34 by means of a fitting 46 on the inner wall 36 a fluid line 48. When fluid under pressure is admitted to the fluid cylinder 34, the piston 40 is moved from the position illustrated in Figure 7 to the position illustrated in Figure 8 to project the roadway engaging elements 44 to an operative position. In order to limit outward movement of the piston 40, there is carried by the outer part of the fluid cylinder 34 a locking ring 50 which engages the piston and serves as a stop member. In order that the piston 40 may be automatically returned to its retracted position of Figure 7 and the fluid pressure within the fluid cylinder 34 has been released, there is provided a return spring 52. The return spring 52 has one end thereof secured to an anchor member 54 carried by the inner wall 36. The opposite end of the spring 52 is connected to an anchor member 56 which is secured to the piston 40.

Figure 2:
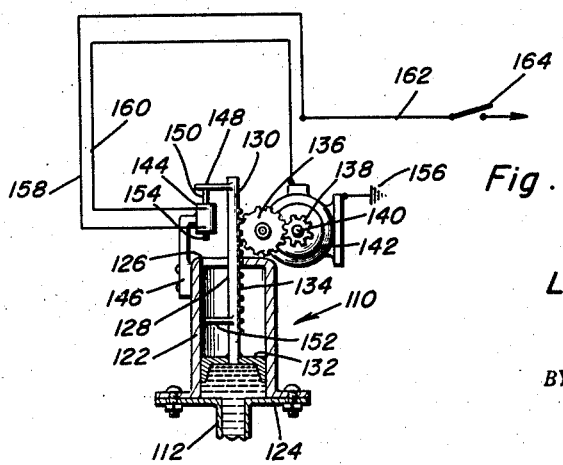
Figure 2 is an enlarged vertical sectional view taken through a fluid pump of the traction device and shows the specific details thereof.

As is best illustrated in Figures 1 and 2, each tire 26 is provided with a plurality of bores 28. The bores 28 are spaced both transversely of the tread surface 30 and circumferentially thereof.

Figure 6:
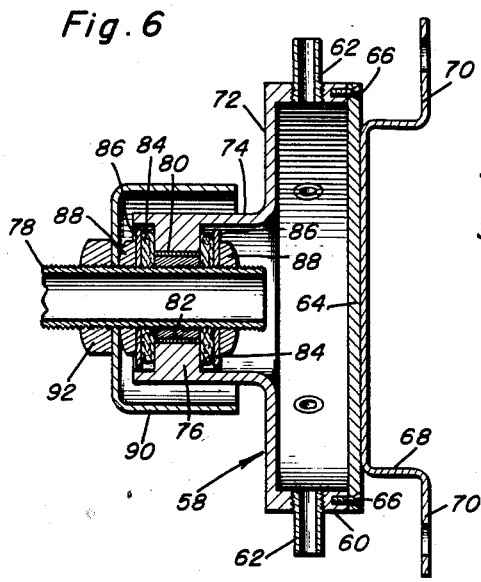
Figure 6 is an enlarged fragmentary sectional view taken substantially upon the plane indicated by the section line 6—6 of Figure 5 and shows the specific details of the fluid distributor.

In order that fluid under pressure may be supplied to each of the many fluid motors 32, there is provided a fluid distributor which is referred to in general by the reference numeral 58. The fluid distributor 58, as is best illustrated in Figure 6, includes a flat circular housing 60 which has extending radially therefrom a plurality of fittings 62. The housing 60 includes a removable back wall 64 which is held in place by fasteners 66. Secured to the removable back wall 64 is a mounting strap 68 having end portions 70 which are engageable over the lug bolts 20 for securing the fluid distributor 58 in place.

The housing 60 also includes a front wall 72 which includes a reduced outwardly extending portion 74. The portion 74 is of a tubular construction and includes a relatively thick internal annular ring 76. Connected to the fluid distributor 58 for supplying fluid thereto is a fixed fluid supply pipe 78. The supply pipe 78 is externally threaded in the vicinity of the fluid distributor 58 and extends into the portion 74 through the ring 76.

The ring 76 carries a bearing 80 which engages a bearing engaging surface 82 carried by an intermediate part of the end portion of the fluid supply pipe 78. Disposed on opposite sides of the bearing engaging member 82 are seal forming elements 84 which engage the faces of the ring 76 at opposite ends thereof. Bearing against the seal forming elements 84 are washers 86 which are retained in place by nuts 88 threadedly engaged on the threaded portion of the fluid supply pipe 78. Thus there is provided a suitable connection whereby the fluid supply pipe 78 may remain stationary while the fluid distributor 58 is free to rotate with the individual wheel assembly 22.

In order to both protect the connection between the fluid supply pipe 78 and the fluid distributor 58 and to prevent entrance dust and dirt into the seal portion therebetween, there is provided a protective cover 90. The cover 90 is clamped in place by a nut 92 threadedly engaged on the fluid supply pipe 78. The cover 90 has a portion thereof clamped between the nut 92 and one of the nuts 88.

Referring now to Figure 3 in particular, it will be seen that carried by the rim portion 94 of each of the wheels 24 are fittings 96 which are in the form of short lengths of tubing or pipe. There is one fitting 96 for each of the fittings 62. Extending between corresponding fittings 62 and 96 are fluid supply lines 98 which are preferably of the flexible type. Mounted on the end of each fitting 96 within the tire 26 is a special fluid supply line 100 which includes a main portion 102 which is engaged over the fitting 96 and a plurality of distributor portions 104 which are connected to the individual fittings 46. As is illustrated in the drawings, each fluid supply line 100 will supply three fluid motors 32, however, this may be varied as desired.

Referring once again to Figure 1 in particularly, it will be seen that the vehicle on which the traction device is mounted includes a frame having longitudinal frame rails 106. Suitably secured to the frame rails 106 are depending hangers 108 to which upper parts of the fluid supply pipes 78 are connected. These retain the fluid supply pipes 78 in an out-of-the-way position within the wheel wells receing the wheels 22.

The fluid system of the traction device also includes a fluid pump which is referred to in general by the reference numeral 110. The fluid pump 110 has connected thereto a main supply line 112 which terminaes in a fitting 114. Extending outwardly from the fitting 114 are auxiliary supply lines 116 which are in turn connected to the fluid supply pipes 78 by means of flexible conduits 118. The supply lines 116 are secured in fixed relation with respect to the frame by means of suitable clamps 120 carried by the frame rails 106.

Referring now to Figure 2 in particular, it will be seen that there are illustrated details of the fluid pump 110. The fluid pump 110 includes a pump cylinder 122 which has one end thereof closed by a wall 124 including a connection with the main supply line 112. The upper end of the pump cylinder 122 is closed by an upper wall 126 having an opening 128 for the passage of a piston rod 130. Carried by the lower end of the piston rod 130 within the pump cylinder 122 is a piston 132.

In order to effect movement of the piston 132 for pressurizing the fluid system of the traction device and extending the fluid motors 32, there is carried by the piston rod 130 a rack portion 134. Engaged with the rack portion 134 is a drive gear 136 which is in turn meshed with the gear 138 carried by an armature shaft 140 of an electric motor 142. The electric motor 142 is of the reversible type and is of a voltage to be connected into the electrical system of the vehicle on which the traction device is mounted.

In order that downward movement of the piston 132 may be limited, there is provided a limit switch 144 which is mounted on the pump cylinder 122 by means of a mounting bracket 146. The upper end of the piston rod 130 carries a stop member 148 for engagement with a plunger 150 of the limit switch 144.

Also carried by an intermediate part of the piston rod 130 is a lower stop member 152 which is engageable with the lower plunger 154 of the limit switch 144 to limit upward movement of the piston 132.

It is to be understood that the motor 142 is grounded as at 156. Connected to the limit switch 144 are wires 158 and 160. The wire 160 is connected to the motor 142 whereas the wire 158 will be connected to a wire 162 which leads to the battery or other source of electrical energy of the vehicle.

From the foregoing description of the traction device, it will be readily apparent that there has been devised a traction device which is of such a construction whereby it may be mounted on existent vehicles with a minimum of alteration to the vehicles, the alterations being limited to the mounting of the pump 110 and the supply lines passing therefrom and the incorporation in the electrical system of the vehicle an extra line, the line 162 which is controlled by a switch 164 placed for manual operation by the operator of the vehicle. Thus the traction device may be readily mounted on a vehicle and is of such a nature whereby it may be transferred from one vehicle to another should the owner of the traction device desire to do so when he buys another vehicle. Further, the traction device is of such a nature whereby the individual wheels 22 may be removed from the vehicle without any extra trouble on the part of the operator of the vehicle inasmuch as the wheels are held in place by the regular lug bolts and none of the traction device prevents removal of the wheel once the lug bolts have been removed.

Although the traction device has been illustrated and described as being mounted on only the rear wheels of a vehicle, it is to be understood that if it is so desired, such a device may be mounted on the front wheels. However, normally the front wheels of a vehicle are steerable and it is only desired to obtain sufficient traction with the rear wheels to maintain headway. This mounting is a question of choice on the part of the owner of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traction device for vehicles comprising at least one wheel assembly, said wheel assembly comprising a wheel, a tire mounted on said wheel, said tire having a roadway engaging surface, a plurality of bores opening radially through said roadway engaging surface, each of said bores extending entirely through the tire and including an enlarged outer portion and a reduced inner portion, a fluid motor mounted in each of said bores, said fluid motor being of the extensible type and including a cylinder, said cylinder being seated in the enlarged portion of its respective bore and including a connecting fitting projecting into the reduced portion of said bore, a piston disposed in said cylinder, a roadway engaging element carried by said piston for projection from said tire, and a fluid system connected to said fluid motor for actuating said piston, said fluid system including a hose connected to said fitting and projecting into said reduced portion of said bore.

2. The traction device of claim 1 wherein said cylinder is provided with circumferentially projecting anchoring rings embedded in said tire.

References Cited in the file of this patent

UNITED STATES PATENTS

| | | |
|---|---|---|
| 1,557,211 | Lee | Oct. 13, 1925 |
| 2,480,548 | Carhart | Aug. 30, 1949 |
| 2,619,906 | Gardenhour | Dec. 2, 1952 |
| 2,672,908 | Donegan | Mar. 23, 1954 |
| 2,781,813 | Ferguson | Feb. 19, 1957 |
| 2,888,056 | Zahlten | May 26, 1959 |